(12) United States Patent
Radtke

(10) Patent No.: US 8,474,564 B2
(45) Date of Patent: Jul. 2, 2013

(54) SELF-PROPELLED WHEEL FOR BICYCLES AND SIMILAR VEHICLES

(76) Inventor: Jeffrey L. Radtke, Madison, WI (US)

( * ) Notice: Subject to any disclaimer, the term of this patent is extended or adjusted under 35 U.S.C. 154(b) by 91 days.

(21) Appl. No.: 13/136,931

(22) Filed: Aug. 15, 2011

(65) Prior Publication Data

US 2012/0037442 A1    Feb. 16, 2012

Related U.S. Application Data

(60) Provisional application No. 61/401,455, filed on Aug. 13, 2010.

(51) Int. Cl.
*B62K 11/00*    (2006.01)
(52) U.S. Cl.
USPC ............. 180/206.5; 180/205.1; 180/206.1; 280/279; 280/276

(58) Field of Classification Search
USPC ............. 180/205.1, 206.1, 206.5; 280/279, 280/276
See application file for complete search history.

(56) References Cited

U.S. PATENT DOCUMENTS

| 6,321,863 B1 * | 11/2001 | Vanjani | 180/65.51 |
| 6,971,467 B2 * | 12/2005 | Katsaros | 180/206.5 |
| 7,156,196 B2 * | 1/2007 | Katsaros | 180/206.5 |
| 8,302,982 B2 * | 11/2012 | Bastianen | 280/281.1 |
| 2010/0264622 A1 * | 10/2010 | Bastianen | 280/281.1 |

* cited by examiner

*Primary Examiner* — Kevin Hurley
*Assistant Examiner* — Michael Stabley

(57) ABSTRACT

A wheel with a self-contained drive mechanism is provided to propel (or assist in propulsion of) bicycles, tricycles, and similar vehicles. The wheel preferably takes the form of a detachable wheel, which is readily received within the dropouts of a bicycle frame or fork. Thus, the wheel may be added to (or removed from) preexisting standard bicycles and the like.

20 Claims, 5 Drawing Sheets

SELF-PROPELLED WHEEL FOR BICYCLES AND SIMILAR VEHICLES

CROSS-REFERENCE TO RELATED APPLICATIONS

This application claims the benefit of priority under 35 USC §119(e) of the following U.S. Provisional Patent Application:
61/401,455 filed Aug. 13, 2010.
The entireties of the foregoing applications are incorporated by reference herein.

This document incorporates by reference the U.S. patent application Ser. No. 10/993,961, filed on Nov. 19, 2004, and published as US 2005/0067207 A1 on Mar. 31, 2005, and U.S. Pat. No. 7,721,835 B2, issued on May 25, 2010, and U.S. Provisional Application 61/397,871 filed on Jun. 17, 2010. A detailed description of a new version of the invention is included in subsequent paragraphs. This new version improves upon integrated drive system usability by including an adjustable triangular frame, which is compatible with a direct drive hub motor. This addition increases the stability, durability and safety of a self-contained drive system incorporating a direct drive or geared hub motor, which may be instantly and securely installed on a conventional bicycle.

FIELD OF THE INVENTION

This document concerns an invention relating generally to devices for assisting in the propulsion of human-powered vehicles (such as bicycles), and more specifically to motor-driven wheels for bicycles.

BACKGROUND OF THE INVENTION

Bicycles, tricycles, and similar human-powered vehicles have in the past been provided with propulsion assistors which help the vehicle's operator propel the vehicle with less effort on the operator's part. Examples of such propulsion assistors are found in U.S. Pat. No. 5,755,304 to Trigg; U.S. Pat. No. 5,855,249 to Nishimura; U.S. Pat. No. 6,347,682 to Buchner; U.S. Pat. No. 6,290,014 to MacCready, Jr.; U.S. Pat. No. 6,024,186 to Suga; U.S. Pat. No. 5,865,267 to Mayer et al.; U.S. Pat. No. 5,842,535 to Dennis; U.S. Pat. No. 5,662,187 to McGovern; U.S. Pat. No. 4,906,053 to Kawai; U.S. Pat. No. 4,028,915 to Stahl; U.S. Pat. No. 5,560,442 to Canderle; U.S. Pat. No. 5,341,892 to Hirose et al.; U.S. Pat. No. 5,474,150 to Mabuchi; U.S. Patent Appln. Publication 2002/0147068 to Chikaraishi; German Patent DE4000960 to Stoll; and Brazilian Patent PI 9601936-0 to Tanaka.

A common approach was to provide a roller which frictionally engaged to a vehicle wheel at the wheel's top, with the roller being driven by an electric or internal combustion engine to thereby drive the vehicle wheel. This approach has several disadvantages, e.g., it raises the center of gravity of the vehicle (which can hinder operation), and it is inefficient insofar as propulsion relies on continuously distorting the vehicle's tire.

Another approach has been to add an external cart behind or adjacent the vehicle, with the cart including a motor and serving as the propulsion assistor. This approach also carries disadvantages, e.g., it changes the handling characteristics and effective size of the vehicle.

A more recent approach has been to provide a motor in place of the hub assembly of one of the vehicle wheels. Batteries and controls for this motor are attached to the vehicle's frame. This approach is disadvantageous in that installation and removal of the propulsion assistor is time-consuming: the vehicle is not readily convertible between a solely human-powered vehicle and a propulsion-assisted vehicle. In some cases, it has been proposed to place the battery for the motor in the rotating portion of the wheel. Given the substantial mass of the battery, this increases the rotational inertia of the wheel, degrading vehicle handling and performance.

BRIEF DESCRIPTION OF THE DRAWINGS

The exemplary version is illustrated in FIGS. 1-5, wherein.

DETAILED DESCRIPTION OF THE EXEMPLARY VERSION (FIGS. 1-5)

The exemplary version described herein is most similar to the fourteenth version of U.S. patent application Ser. No. 10/993,961, in that the anti-rotation, or torque arm may extend to the handlebar, preventing rotation of the motor assembly as it drives the wheel. This exemplary version departs from other versions with the addition of a quick release assembly which attaches to a hub motor, external of the dropouts. Another departure is the inclusion of a triangular frame, formed by adding an adjustable, diagonal member (or strut) between an anti-rotation (or torque) arm and a substantially horizontal frame member supporting drive energy storage means or power conditioning electronics. These additions create a simpler and more versatile design which may incorporate a direct drive or geared hub motor.

Figure 1:
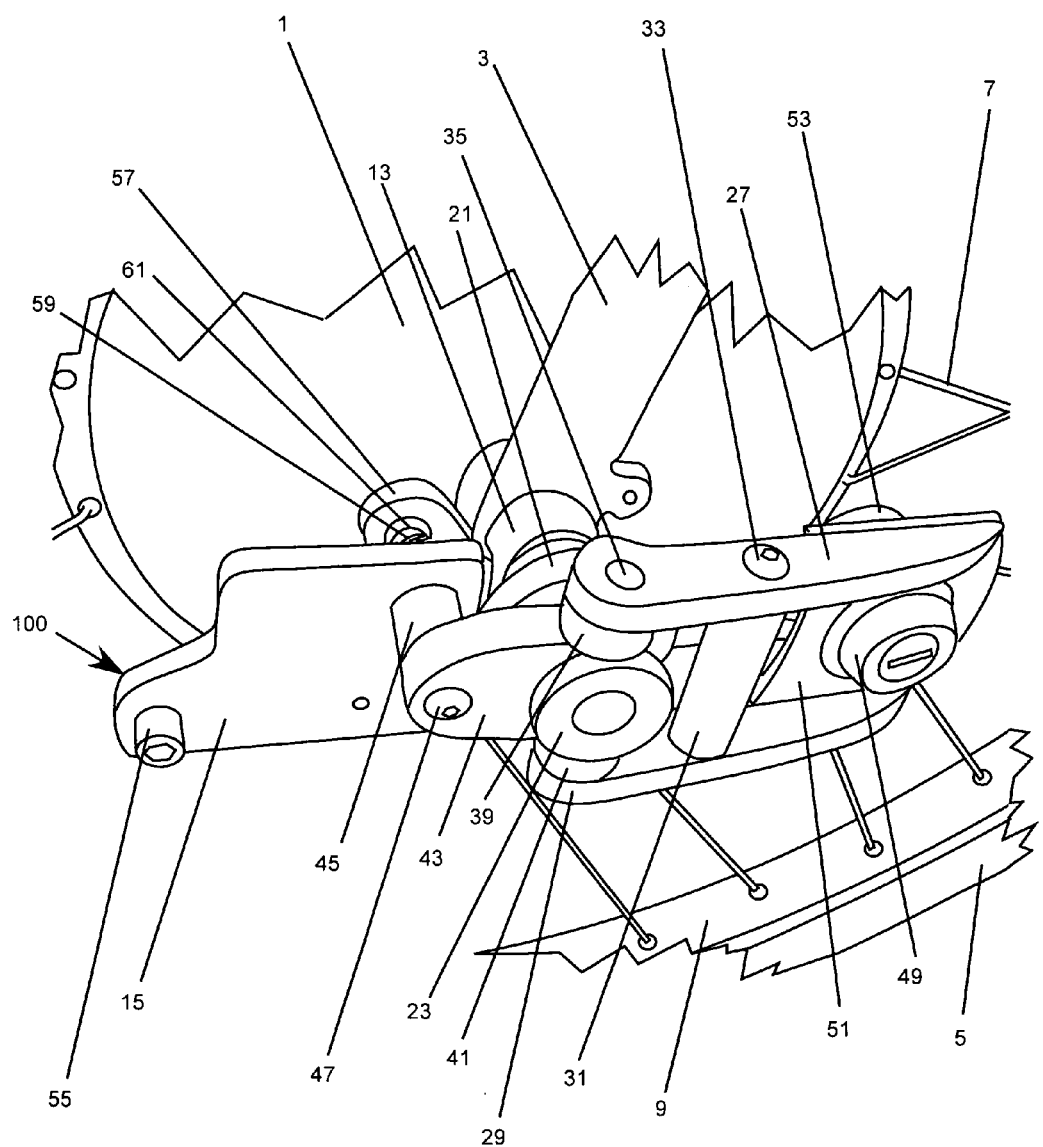
FIG. 1 is an external view of the left side of a quick release assembly, shown attaching a hub motor to a standard bicycle fork, as viewed form the front outboard top.

FIG. 1 shows an external view of the left side of a propulsion assembly 100, shown attaching a hub motor 1 to a standard bicycle 3, as viewed form the front outboard top. The propulsion assembly 100 is specifically configured for use with the bicycle hub motor 1. The hub motor 1 is attached to a tire 5 via a plurality of spokes 7, and a concentric rim 9. The tire 5 is a standard pneumatic tire, similar to those commonly found on gas powered mopeds. Other types of tire will be suitable, and may be alternatively used. The tire 5 is attached to the rim 9 in the usual way for a tire of the indicated dimensions. The rim 9 is similar to a standard, typically aluminum alloy, bicycle wheel rim.

As will be apparent to those skilled in the art, materials for mechanical components are chosen for optimal specific strength, specific stiffness, corrosion resistance, appearance and cost. For example, high strength steel alloys, aluminum alloys, and engineering plastics serve as practical structural materials for most bicycle components. Exemplary drive components, such as hub motors, motor controllers, speed controls, system status displays and batteries can be found at www.ebikes.ca.

Figure 2:
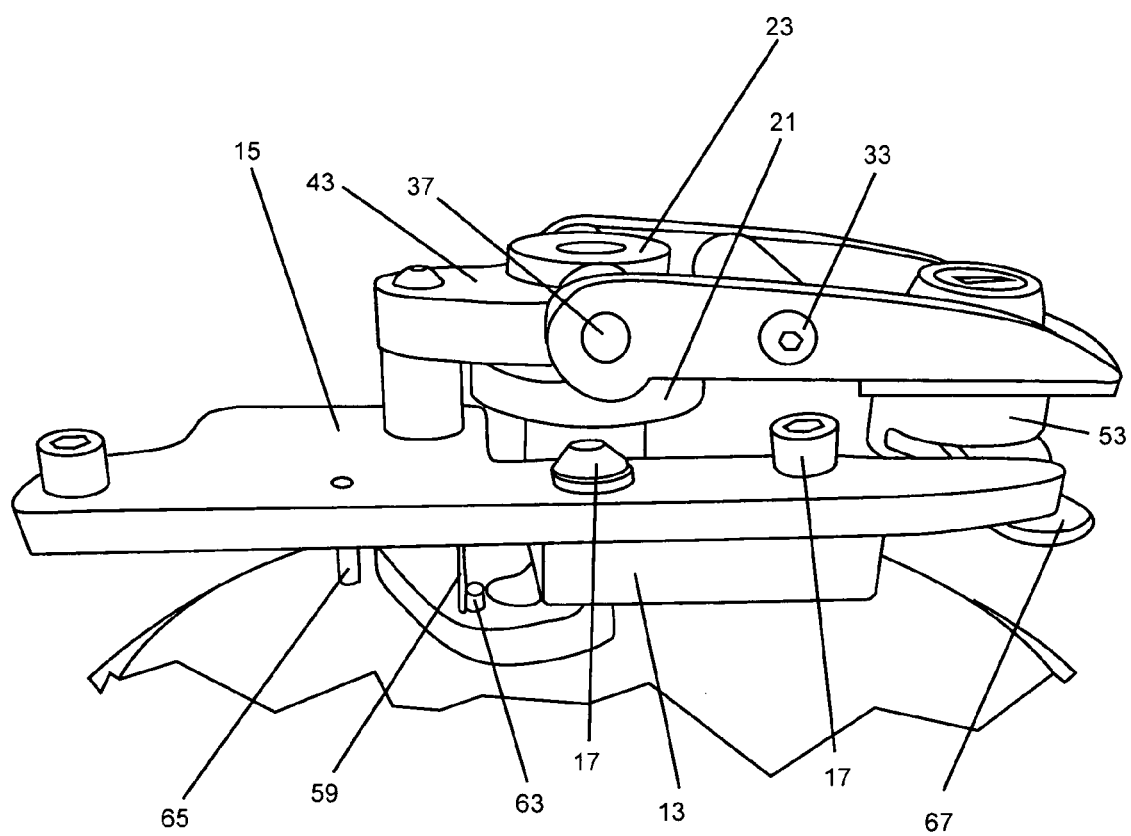
FIG. 2 is an external view of the underside of the assembly depicted in FIG. 1.
Figure 3:
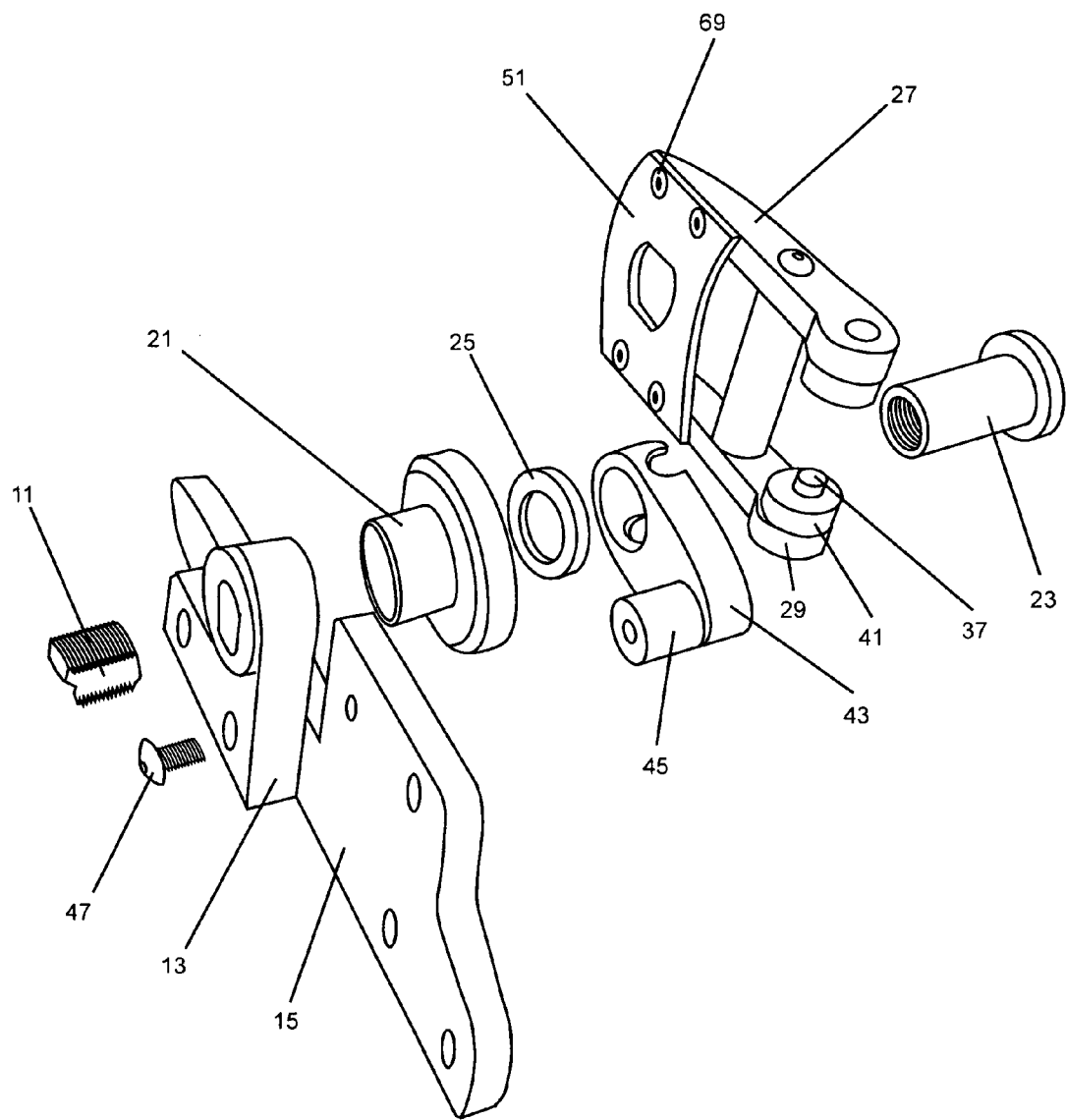
FIG. 3 is an exploded view of the wheel securing components of the assembly depicted in FIG. 1, as viewed from the front inboard top.

Torque is transferred from the hub motor 1 to the bicycle frame through a hub motor axle 11, which will be shown in FIG. 3. The cylindrical hub motor axle 11 includes at least one flat surface on its outer diameter which engages at least one corresponding flat machined into the inner diameter of a torque transfer bushing 13. The torque transfer bushing 13 is secured to a torque arm plate 15 with a plurality of torque transfer fasteners 17, as will be shown in FIG. 2.

Compressive axial force is applied via the quick release assembly to press the dropout of the bicycle 3 against a flange on the hub motor axle 11. An axial force transfer bushing 21 pushes the torque transfer bushing 13 against the dropout of the bicycle 3. A flanged axle nut 23 is threaded to the hub motor axle 11. As will be shown subsequently, hand rotation of the flanged axle nut 23 is only possible when the quick release assembly is in the open position.

A lever assembly is rotated 90 degrees from the open to the depicted closed position to impart force between the axial force transfer bushing 21 and the flanged axle nut 23. The lever assembly includes an upper and lower quick release arm, 27 and 29, which are held together by a lever standoff 31 secured by a pair of screws 33. The quick release arms 27 and 29 are press fit over respective upper and lower pivot shafts 35 and 37. The pivot shafts 35 and 37 are press fit onto a pair of respective upper and lower eccentric bushings 39 and 41. The pivot shafts 35 and 37 contact the inboard flange surface of the flanged axle nut 23, and the eccentric bushings 39 and 41 contact the outboard surface of the axial force transfer bushing 21. Since the pivot shafts 35 and 37 are eccentric (off center) with respect to the eccentric bushings 39 and 41, as the quick release arms 27 and 29 are rotated about the pivot shafts 35 and 37, force is applied to the axial force transfer bushing 21. Note that FIGS. 1 and 2 both show the quick release assembly in the closed position. The quick release arms 27 and 29 are perpendicular to the hub motor axle 11 in the closed position, and parallel to the hub motor axle 11 in the open position.

A centering yoke 43 holds the lever assembly in place radially with respect to the hub motor axle 11. As will be seen in FIG. 3, the centering yoke includes slots to engage the pivot shafts 35 and 37. The centering yoke 43 is secured to the torque arm plate 15 by a yoke standoff 45 and a pair of yoke standoff screws 47.

The lever assembly can be locked in the closed position to the torque arm plate 15 by rotating a key (not shown) in a lock barrel 49. The lock barrel 49 is attached to the quick release arms 27 and 29 by a lock mounting plate 51. A lock cover bushing 53 prevents removal of the lock barrel 49 by covering a nut used to secure it to the lock mounting plate 51.

Batteries and/or hub motor drive electronics may be secured to the torque arm plate 15 by several battery box bolts 55. A spring loaded faux dropout 57 slides between the flange of the hub motor axle 11 and the torque transfer bushing 13 as the wheel is removed from the bicycle fork. By taking up the space of the fork 3 dropout, this allows closing of the quick release assembly to secure the mass of the battery to the hub motor axle when the motorized wheel assembly is removed from the bicycle fork 3. A faux dropout spring 59 forces the faux dropout 57 into place as the wheel is removed from the bicycle. The faux dropout spring 59 is a torsion spring wound around a dropout spring mandrel 61. The dropout spring mandrel 61 is attached to the torque arm plate 15 by a yoke standoff screw 47.

FIG. 2 is an external view of the underside of the assembly, showing several parts hidden in FIG. 1. An aft spring retainer pin 63 is press-fit into the faux dropout 57. A forward spring retainer pin 65 is press-fit into the torque arm plate 15. The spring retainer pins 63 and 65 engage the arms of the dropout spring 59. A lock swingarm 67 is shown engaging the torque arm plate 15.

FIG. 3 is an exploded view, indicating the relationships of the wheel securing components of the assembly depicted in FIG. 1. The end of the hub motor axle 11 is shown. An axle nut collar 25 is press fit onto the flanged axle nut 23, such that the centering yoke 43 is retained between it and the flange of the flanged axle nut 23. The axle nut collar 25 serves to pull the torque arm plate 15 away from the dropout of the bicycle 3 as the assembly is released and the flanged axle nut 23 is turned counterclockwise. A plurality of lock plate screws 69 secure the lock mounting plate 51 to the quick release arms 27 and 29.

This figure shows the flats on the inner diameter of the torque transfer bushing 13. Note also that the torque transfer bushing 13 features a raised region around the axle hole to accommodate safety tabs protruding from the dropouts of the bicycle fork 3.

Normal operation of the quick release assembly is as follows: To open the quick release assembly, the quick release arms 27 and 29 are rotated counterclockwise 90 degrees from the depicted position about the upper and lower pivot shafts 35 and 37. The flange of the flanged axle nut 23 is then turned counterclockwise to move the propulsion assembly 100 out from the dropout of the bicycle fork 3. After completing a similar procedure on the opposite side of the bicycle, the bicycle 3 can be separated from the propulsion assembly 100 by lifting the front end of the bicycle up. The faux dropout 57 will spring into place between the flange in the hub motor axle 11 and the torque transfer bushing 13. The quick release is secured on the faux dropout 57, or the bicycle fork 3, by closing the quick release assembly 100. This is accomplished by rotating the quick release arms 27 and 29 by 90 degrees, back to the position depicted in FIGS. 1 and 2.

Figure 4:
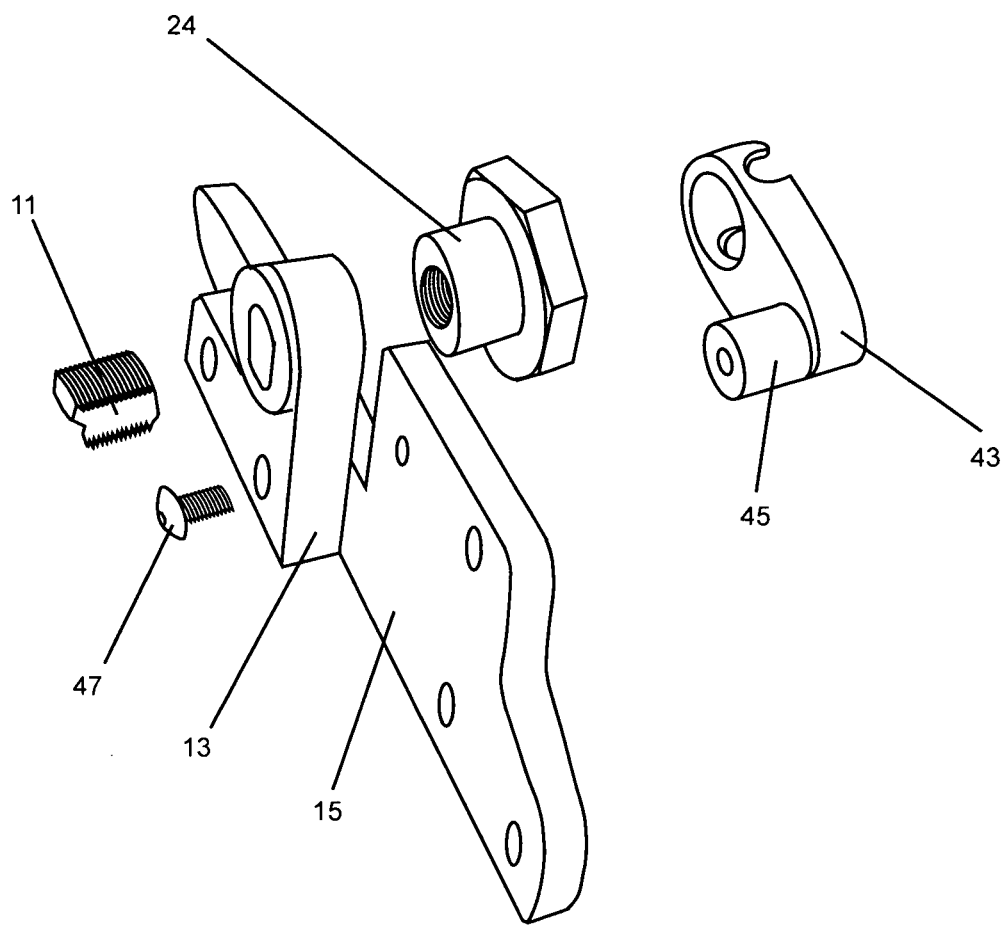
FIG. 4 is an exploded view of the wheel securing components of the assembly depicted in FIG. 1, with a nut substituted for the quick release lever, as viewed from the front inboard top.

For a more permanent installation, the user may substitute a nut for the quick release lever. FIG. 4 is an exploded view of the wheel securing components of the assembly depicted in FIG. 1, with a nut substituted for the quick release lever, as viewed from the front inboard top. Components associated with the action of the lever assembly are not necessary, and are removed. In their place, a hexagonal flanged axle nut 24 threads on to the hub motor axle 11, between the torque transfer bushing 13 and the centering yoke 43. Note that the hexagonal flanged axle nut 24 will engage an open end or adjustable wrench during installation, so that the hexagonal flanged axle nut 24 may be rotated about the hub motor axle 11. Such rotation will move the respective side of the propulsion assembly 100 toward or away from the dropouts of the bicycle 3, facilitating installation or removal of the propulsion assembly 100.

Figure 5:
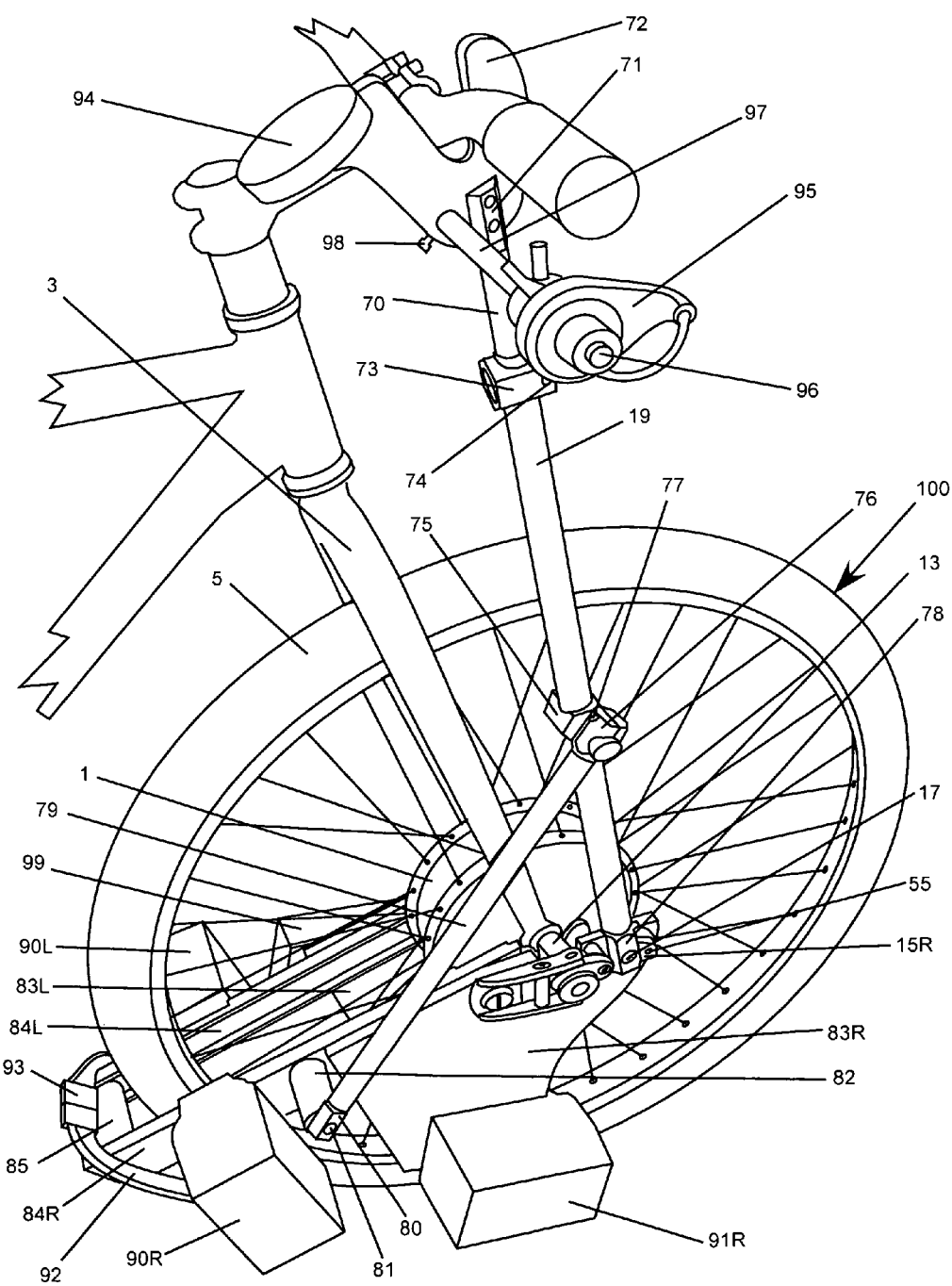
FIG. 5 is an external view of the right side of a complete bicycle propulsion system, incorporating the mirror image of the quick release assembly depicted in FIG. 1, shown attaching a hub motor to a standard bicycle fork, as viewed form the rear outboard top.

FIG. 5 is an external view of the right side of the complete bicycle propulsion system, incorporating the mirror image of the quick release assembly depicted in FIG. 1, shown attaching a hub motor to a standard bicycle fork, as viewed form the rear outboard top.

A lower torque arm 19 is secured to the torque arm plate with a torque transfer fastener 17. The lower torque arm 19 may terminate in components which anchor anyplace along the bicycle steering column, but preferably far from the bicycle fork dropout. As shown in U.S. patent application Ser. No. 10/993,961, the lower torque arm 19 may be coupled to the bicycle handlebar.

A diagonal strut 79 stiffens and fixes the angular position of the lower torque arm 19 by connecting it to parts extending horizontally from its base. The diagonal strut 79 rotatably connects to the lower torque arm 19 through an upper diagonal pivot 75. The upper diagonal pivot 75 includes a hole through which the lower torque arm 19 passes, so that the upper diagonal pivot 75 is free to slide along the lower torque arm 19 when the propulsion assembly 100 is fitted to the bicycle 3. After fitting, the upper diagonal pivot 75 is secured to the lower torque arm 19 by a bolt (not shown) which reduces the hole diameter in the upper diagonal pivot 75 in a manner similar to a standard bicycle seat post clamp. The upper diagonal pivot 75 includes a cyclindrical protrusion, which is inserted into a upper diagonal endcap 76. The upper diagonal endcap 76 is attached to, or forms part of, the diagonal strut 79. The upper diagonal endcap 76 rotates about the cylindrical protrusion of the upper diagonal pivot 75 during fitting of the propulsion assembly 100 to the bicycle 3. The upper diagonal endcap 76 is clamped to the upper diagonal pivot 75 by a upper diagonal endcap fastener 77, also in a manner analogous to a bicycle seat post clamp. The lower torque arm 19 is attached to a lower torque arm endcap 78. The torque arm fastener 17 is loose during fitting of the propulsion assembly 100 to the bicycle 3, and subsequently tightened.

A lower diagonal endcap 80 is attached to the lower end of the diagonal strut 79. The lower diagonal endcap 80 is secured to an lower diagonal offset 82 by a lower diagonal pivot fastener 81. The upper diagonal pivot 75, upper diagonal endcap fastener 77, lower diagonal pivot fastener 81, and torque arm fastener 17 are loose during fitting, so that the angular orientation of the lower torque arm 19 about the torque arm fastener 17 can be changed. Alternatively, the above parts may be coupled in a manner which permanently secures them while allowing them to rotate about the corners of the triangular frame, since fixing the angles between the triangular frame members, by positioning the upper diagonal pivot 75 along the lower torque arm 19, is all that is required to define the frame. Such a practice may, however, result in excessive vibration. The lower diagonal offset 82 attaches to a support extension channel 84R by a bolt (not shown). Note that the diagonal strut 79 is axially offset by the lower diagonal offset 82 and the upper diagonal pivot 75, such that clearance is obtained for the fork of the bicycle 3.

An auxiliary battery support 83R is bolted to the support extension channel 84R, and to the torque arm plate 15R. A removable rear standoff 85 structurally connects the left and right sides of the propulsion assembly 100, aft of the circumference of the tire 5. The left side of the propulsion assembly 100 includes an auxiliary battery support 83L and a support extension channel 84L. The removable rear standoff 85 is secured to the aft ends of the support extensions channels 84R and 84L by threaded fasteners, which are occluded by other parts in FIG. 5.

The top of the lower torque arm 19 is surrounded by a telescoping clamp 73, which compresses (as a bicycle seat post clamp) around the lower torque arm 19 when a telescoping clamp bolt 74 is tightened. The telescoping clamp bolt 74 secures an upper torque arm 70, and the upper torque arm 70 telescopically fits inside the lower torque arm 19, such that an adjustable length of the upper torque arm 70 extends toward the handlebar of the bicycle 3. The end of the upper torque arm 70 is attached to a upper torque arm coupling 71. The upper torque arm coupling 71 is attached to a upper torque arm restraint 72, which engages the handlebar of the bicycle 3 during assembly.

A main battery 90R is supported near the aft circumference of the tire 5 by the support extension channel 84R. A auxiliary battery 91R is supported near the steering axis and below the dropout of the bicycle 3 by the auxiliary battery support 83R. A data/power cable 92 carries power and information between the two sides of the propulsion assembly 100. A data/power connector 93 is located in the data/power cable 92, near the removable rear standoff 85. To change the tire 5, the propulsion assembly 100 must be removed from the bicycle 3, the removable rear standoff 85 must be removed, and the data/power connector 93 opened.

The left side of the propulsion assembly 100 includes a main battery 90L and a auxiliary battery 91L (not shown). A motor controller 99 conditions power for the hub motor 1, and is secured to the auxiliary battery support 83L. The top of the upper torque arm 70 includes a status display 94, which may display such information as battery voltage, energy content, current, trip distance, odometer, and speed. A speed control 95 is mounted near the handlebar grip of the bicycle 3, so that if can be adjusted by a rider's thumb or finger. A kill switch 96 is mounted near the speed control 95. The speed control 95 and kill switch 96 are supported by a speed control mount strut 97, which extends from the upper torque arm restraint 72. The speed control mount strut 97 may be adjustably extended or rotated, to place the speed control 95 in a convenient location. After fitting the propulsion assembly 100 to the bicycle 3, the position of the speed control 95 is secured by tightening a speed control clamp bolt 98.

The main battery 90R and the main battery 90L are required for operation of the hub motor 1. The auxiliary battery 91R and the auxiliary battery 91L may be added, omitted or removed, depending on the travel distance required, or resources available for battery purchase. The main battery 90R and the main battery 90L are located significantly aft of the hub motor 1, so that the propulsion assembly 100 is nearly balanced about the steering axis of the bicycle 3. This dampens oscillations in steering, sometimes referred to as "shimmy" or "speed wobble." Shimmy is often observed in bicycles with a hub motor, since this component can weigh more than a conventional steering assembly, and is located forward the steering axis. The optional auxiliary battery 91R and auxiliary battery 91L are located near the steering axis, so that they may be added or removed without changing the balance of the steering column.

Alternative variations of this version are described below:

The quick release assembly of FIG. 1 may be used to secure wheel propulsion systems described in patent documents which were previously incorporated by reference.

As will be apparent to those skilled in the art, some structural or electronic components may be combined for simplicity in manufacture. Welds or adhesives may be substituted for bolts or other forms of mechanical fasteners. Referring to FIG. 3 for example, components which comprise the lever assembly are depicted in the group of parts located between the flanged axle nut 23 and the centering yoke 43. Referring to FIG. 4 as a further example, the torque transfer bushing 13 and the torque arm plate 15 may be combined to form a simplified torque transfer member, while the centering yoke 43 and the yoke standoff 45 may be combined to form a simplified centering yoke. These components may be combined to form one or more single parts, as a cast or welded assembly.

What is claimed is:

1. A wheel propulsion device for propelling a bicycle having a steering column with a steering axis, said steering column including a handlebar descending to a front fork, said fork having a pair of downwardly descending opposing legs, each leg having a lower dropout, said wheel propulsion device comprising:
    (a) a rotatable wheel;
    (b) a hub motor to rotate the wheel with respect to said steering column;

(c) an axle with a flat radial surface to transfer torque from said hub motor, disposed such that said axle is inserted in each said lower dropout as said wheel propulsion device is installed on said bicycle;

(d) a torque transfer bushing featuring a flat surface on its inner diameter, disposed such that said torque transfer bushing will rotationally engage said flat radial surface of said axle, thereby transferring torque from said axle to said steering column;

(e) a threaded member surrounding said axle, disposed such that said torque transfer bushing is urged toward said dropout as said threaded member is rotated;

(f) a yoke connected to said torque transfer bushing, disposed such that said yoke is urged away from said dropout as said threaded member is counter-rotated.

2. The wheel propulsion device of claim 1, further comprising an energy storage device.

3. The wheel propulsion device of claim 1, further comprising a torque arm extending from said torque transfer bushing to said handlebar.

4. The wheel propulsion device of claim 3, further comprising a status display attached to said torque arm near said handlebar.

5. The wheel propulsion device of claim 3, further comprising a speed control attached to said torque arm near said handlebar.

6. The wheel propulsion device of claim 1, further comprising a faux dropout, disposed such that said faux dropout is inserted substantially surrounding said axle in place of said lower dropout as said wheel propulsion device is removed from said bicycle.

7. The wheel propulsion device of claim 6, further comprising a spring assembly, whereby said spring assembly urges said faux dropout in place of said lower dropout as said wheel propulsion device is removed from said bicycle.

8. The wheel propulsion device of claim 1, wherein said threaded member includes a flange; further comprising:

(a) an axial force transfer bushing, surrounding and slidably disposed with respect to said threaded member;

(b) a collar surrounding and attached to said threaded member, disposed such that said collar urges said yoke away from hub motor as said threaded member is counter-rotated;

(c) a quick release pivot shaft disposed perpendicular to said axle;

(d) an eccentric bushing surrounding said pivot shaft;

(e) a quick release lever, disposed such that rotation about said pivot shaft urges said pivot shaft towards said flange while urging said eccentric bushing towards said axial force transfer bushing.

9. The wheel propulsion device of claim 8, further comprising a lock barrel to prevent rotation of said quick release lever.

10. The wheel propulsion device of claim 9, further comprising:

(a) a faux dropout, disposed such that said faux dropout is inserted substantially surrounding said axle in place of said lower dropout as said wheel propulsion device is removed from said bicycle;

(b) a spring assembly, whereby said spring assembly urges said faux dropout in place of said lower dropout as said wheel propulsion device is removed from said bicycle;

(c) an energy storage device;

(d) a torque arm extending from said torque transfer bushing to said handlebar;

(e) a status display attached to said torque arm near said handlebar;

(f) a speed control attached to said torque arm near said handlebar.

11. A wheel propulsion device for propelling a bicycle having a steering column with a steering axis, said steering column including a handlebar descending to a front fork, said fork having a pair of downwardly descending opposing legs, each leg having a lower dropout, said wheel propulsion device comprising:

(a) a rotatable wheel;

(b) a hub motor to rotate the wheel with respect to said steering column;

(c) an axle with a flat radial surface to transfer torque from said hub motor, disposed such that said axle is inserted in each said lower dropout as said wheel propulsion device is installed on said bicycle;

(d) a torque transfer bushing featuring a flat surface on its inner diameter, disposed such that said torque transfer bushing will rotationally engage said flat radial surface of said axle, thereby transferring torque from said axle to said steering column;

(e) a horizontal frame member extending substantially horizontally and aft from said torque transfer bushing;

(f) a torque arm extending substantially vertically from said torque transfer bushing;

(g) a diagonal strut attached to said horizontal frame member and said torque arm.

12. The wheel propulsion device of claim 11, further comprising an energy storage device attached to said horizontal frame member.

13. The wheel propulsion device of claim 11, wherein said torque arm further comprises a telescoping tube, whereby length of said torque arm is adjusted.

14. The wheel propulsion device of claim 11, wherein a pivotable fastener is included at each connection between said horizontal frame member, said vertical frame member, and said diagonal strut, with at least one said pivotable fastener being slidably attached, whereby the angular orientation of said torque arm is adjusted.

15. The wheel propulsion device of claim 11, wherein said torque arm extends to said handlebar.

16. The wheel propulsion device of claim 15, further comprising a status display attached to said torque arm near said handlebar.

17. The wheel propulsion device of claim 15, further comprising a speed control attached to said torque arm near said handlebar.

18. The wheel propulsion device of claim 11, wherein a plurality of said energy storage devices are disposed on both sides of said bicycle, said energy storage devices supported by a pair of said horizontal frame members, said horizontal frame members removably attached to each other at the aft end.

19. The wheel propulsion device of claim 18, wherein said energy storage devices are electrically connected by a removable connector disposed near the aft end of said horizontal frame members.

20. The wheel propulsion device of claim 11, further comprising a means for axial position adjustment of said torque transfer bushing during installation of said wheel propulsion device on said bicycle.

* * * * *